Figures 1, 4:
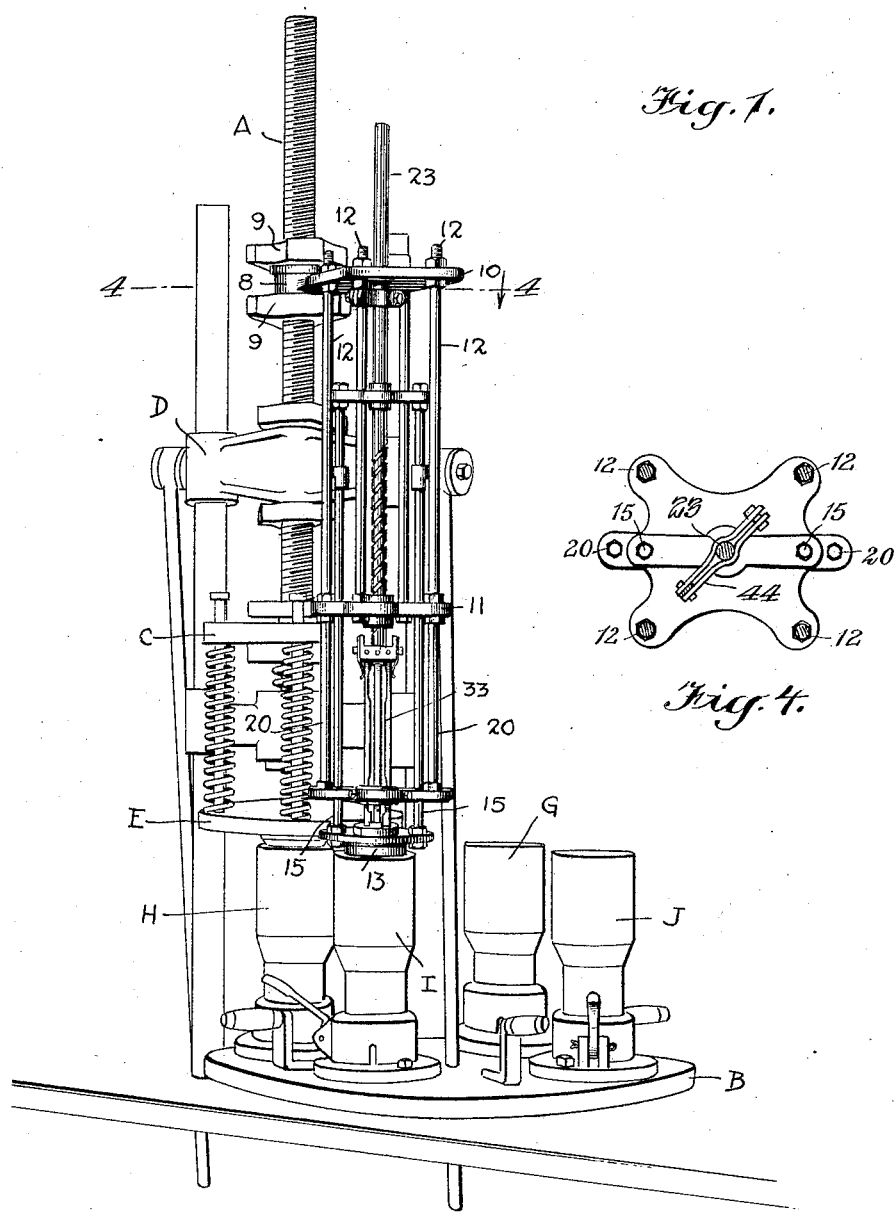

R. JOHNS.
NECK GROOVING ATTACHMENT FOR BOTTLE MOLDING MACHINES.
APPLICATION FILED DEC. 29, 1910.

1,006,383.

Patented Oct. 17, 1911.

2 SHEETS—SHEET 1.

WITNESSES

INVENTOR
Robert Johns
BY
ATTORNEYS

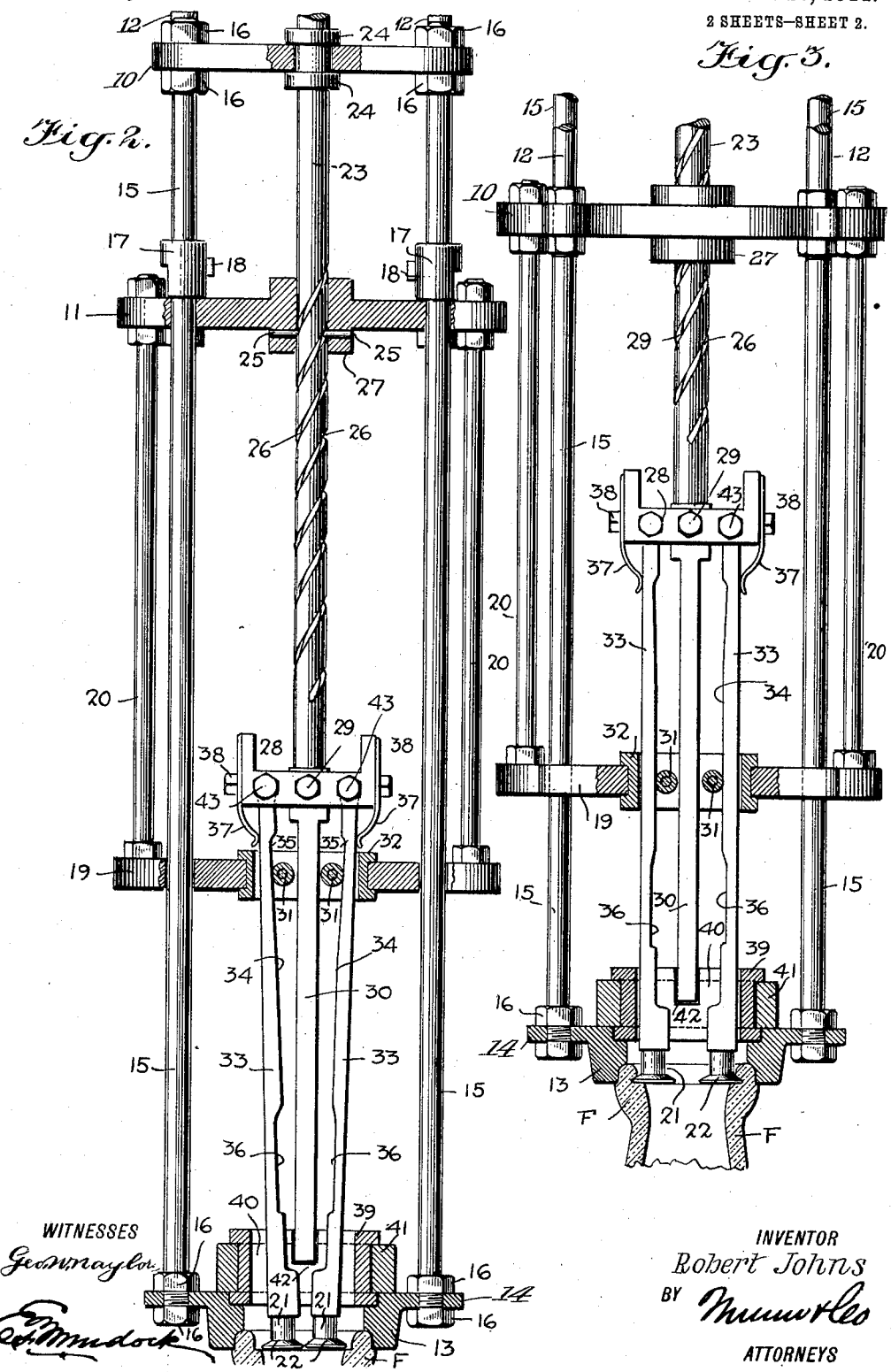

UNITED STATES PATENT OFFICE.

ROBERT JOHNS, OF FAIRMONT, WEST VIRGINIA.

NECK-GROOVING ATTACHMENT FOR BOTTLE-MOLDING MACHINES.

1,006,383. Specification of Letters Patent. Patented Oct. 17, 1911.

Application filed December 29, 1910. Serial No. 599,845.

*To all whom it may concern:*

Be it known that I, ROBERT JOHNS, a citizen of the United States, and a resident of Fairmont, in the county of Marion and State of West Virginia, have invented a new and Improved Neck-Grooving Attachment for Bottle-Molding Machines, of which the following is a full, clear, and exact description.

Among the principal objects which the present invention has in view are: To form in the neck of a bottle, adjacent the delivery end and on the inner surface thereof, an outwardly extended groove of uniform dimensions; to provide the usual molding machine with a mechanism whereby the said groove may be produced in the bottle without necessitating reheating of any part thereof; and to provide an attachment of the character above mentioned operable in unison with the molding mechanism for forming the bottle to which the groove is imparted.

With these objects in view the invention consists primarily in providing a separate mechanism for grooving the neck of a bottle, mounted upon one or the other of the primal molding tables, to impart the groove in the glass prior to its initial hardening, thereby avoiding reheating.

It further consists in arranging the attachment with reference to the usual molding machine and the intermittent feed of the table so that at each molding operation a grooving operation will be consummated.

It further consists in providing an attachment of the character mentioned having gyrating molding forms and fixed means for controlling the path of said molding forms.

It further consists in constructing a simple, efficient and durable mechanism for carrying into effect the objects above set forth.

One embodiment of the present invention is disclosed in the structure illustrated in the accompanying drawings, in which like characters of reference denote corresponding parts in all the views, and in which—

Figure 1 is a perspective view of a bottle blank molding table, having secured thereon an attachment constructed and arranged in accordance with the present invention; Fig. 2 is a vertical section taken on the median line of said attachment, showing the initial bottle receiving position of the parts of the attachment; Fig. 3 is a similar view, showing the attachment in its operative position; Fig. 4 is a cross section of the attachment taken on the line 4—4 of Fig. 1.

The attachment, as illustrated in the accompanying drawings, embodies a supporting frame adjustably secured to the plunger frame of the bottle molding machine and to the adjusting screw rod A thereof. The supporting frame embodies the bracket plates 10 and 11. The plates 10 and 11 are rigidly connected each to the other by framing bolts 12, 12, set nuts threadedly engaged with the said bolts being provided. The plate 10 has integrally formed thereon a slip collar 8 which slides over the thread of the screw rod A and is clamped in position thereon by means of nuts 9, 9. The plate 11 is securely bolted to the rigid head C of the molding machine. In this manner the movement which is imparted to the cross head D as the same is reciprocated to and from the molding table B, is imparted in like degree to the main supporting frame of the attachment. As the molding machine is provided with a yielding table E normally extended from the head C, so the attachment is provided with a yielding frame for the head 13 shaped and arranged to fit upon and hold, during the groove forming operation, the molded neck F of the bottle.

The yielding frame of the attachment embodies a cross head 14, connecting rods 15, 15, and the head 13, the rods 15, 15 being secured rigidly to the cross head 14 and head 13 by means of nuts 16, 16. The yielding frame thus formed is normally supported upon blocks 17, 17 which are adjustably mounted on the rods 15, 15 by means of set screws 18, 18 to limit the extension of the rods 15 and the head 13 carried thereby. The yielding frame is further guided by a spreader head 19 which is suspended by means of rods 20, 20 from the plate 11.

Supported within the yielding frame is the groove forming mechanism, which consists primarily of flanged spools 21, 21. The flanges 22, 22 formed at the lower ends of the spools 21, 21 may be shaped and varied in dimension to suit the purposes of the present invention. The spools 21, 21 are held uniformly in the position shown best in Figs. 2 and 3 of the drawings, substantially flush with the lower surface of the head 13, by a rotary shaft 23, which is rotatively mounted in the cross head 14, and is supported therein by collars 24, 24 which are fixedly provided on the said shaft 23.

In forming the grooves the spools 21, 21 are gyrated within the mouth opening of the neck F, while the heated glass is yet in a semi-plastic condition. Coincidently with the gyration, and in timed relation therewith, the spools are spread, sinking the flanges 22, 22 into the soft glass and thereby forming the desired groove.

The needed rotation is imparted to the shaft 23 by pins 25, 25, the ends whereof are extended within the spiral grooves 26, 26 formed in the shaft 23. It is to guide the shaft 23 in its reciprocation, and to provide suitable mountings for the pins 25, 25, that the plate 11 is provided with a central housing 27. The shaft 23 is extended through a perforation formed in the plate 10, and is thus guided. At the lower end of the shaft 23 is provided a channeled cross head 28, within which is pivotally mounted the swinging arms, upon the lower ends of which are directly mounted the spools 21, 21.

Fixedly mounted within the channel of the cross head 28 is an elongated and rectangular guiding bar 30. The bar 30 is provided to extend between the rollers 31, 31, which are mounted in a ring 32. The ring 32 is provided with an annular groove, as shown best in Figs. 2 and 3 of the drawings, and is rotatively mounted in the spreader head 19. The rollers 31, 31 are designed to spread the arms 33, 33 as the said head is extended downward toward the neck F of the bottle and conformable to the operation of the cross head D of the bottle molding machine.

The arms 33, 33 are shaped on the inner sides as shown in the drawings, having inclined surfaces 34, 34, the upper ends whereof form recesses 35, 35 and the lower ends whereof terminate adjacent the recesses 36, 36. The recesses 35 and 36 are both formed to permit the inward swing of the arms 33 when held in bearing contact with the rollers 31, the inward swing of the arms being produced by flat leaf springs 37, 37. The springs 37, 37 are fixedly secured to the head 28 by means of screws 38, 38.

The arms 33, 33 are guided in their spreading action by means of a cylindrical guide block 39. The guide block 39 is provided with rectangular guide slots 40, 40 for the guidance of the lower ends of the arms 33, and is further provided with an annular groove to receive the guide ring 41, said ring being fixedly connected to the head 13. The block 39 is further provided with slots 42, closely fitting, and into which is seated the end of the bar 30. In this manner the block 39 is rotated upon the ring 41 by means of the bar 30 and the shaft 23 rigidly connected therewith. From this it is obvious that the arms 33, 33 are relieved of any torsional or twisting strain.

The attachment herein described is disposed with reference to the operating stations of the table B. As shown in the drawings, the stations are four in number, the mold G being disposed at the glass receiving station; the mold H at the neck molding station; the mold I at the groove forming station; while the mold J has reached the blank delivery station from whence the blank is carried to the blow table. The power mechanism by which the cross head is depressed to shape the neck of the blank in the mold H simultaneously depresses and operates the attachment herein described, forming a groove in the blank in the mold I, which, in the immediately preceding operation of the table E has had the neck shaped and hollowed.

The operation of the attachment is as follows: In the lifted position of the cross head of the molding machine, the yielding frame of the attachment, as stated, rests upon the blocks 17. At the commencement of the downward stroke of the cross head D the attachment is lowered upon the bottle, the head 13 fitting lightly but securely over the neck F thereof as the same is contained within the mold I. From this point, and during the further depression of the head C of the molding machine and the plate 11 rigidly connected therewith, the yielding frame of the attachment remains stationary and is supported by the mold I. As the plate 11 advances the pins 25, 25, riding downward through the spiral grooves 26, 26 in the shaft 23, rotate rapidly the said shaft, the rotation being in proportion to the pitch of the grooves 26. It will be observed that this action of the shaft 23 is started after the head 13 has been arrested by the mold I. In this position it will be seen that the inwardly contracted spools 21, 21 and flanges 22, 22 carried thereby are disposed between the lips forming the outer mouth of the neck F, and horizontally in line with the groove desired to be formed in the bottle neck. The spreader head 19, being rigidly connected with the plate 11, is forced downward, carrying therewith the ring 32 and the rollers 31, 31 therein mounted. The ring 32 is rotated in unison with the shaft 23, being thereto influenced by the rectangular bar 30 which extends between the rollers 31. In the descent of the head 19 the rollers 31 ride over the inclined surfaces 34 with which the arms 33 are provided, causing the said arms to swing on the pivot bolts 43, 43 outward against the inner surface of the neck of the bottle, to be gradually embedded therein until the said rollers 31 pass downward into the recesses 36, 36, when the springs 37, operating to recontract the arms 33, remove the flanges 22 from the groove thus formed. It will be observed that during this operation the relative heat of the glass and the spools 21 is such as to cool the glass so that when the rollers 31 have passed into the recesses 36, and the flanges 22 of the spools 21 are withdrawn from the groove formed, the glass of the bottle has sufficiently hardened to maintain the impact of the shape imparted.

It is to prevent the too sudden expansion of the arms 33 as the attachment is lifted that I have provided the spring brake 44, which, being mounted upon the plate 10, bears against the side of the shaft 23 shown best in Fig. 4 of the drawings, slowing the rotation of the said shaft as induced by the weight of the yielding frame of the attachment resting as it does upon the pins 25, 25. This construction results in a relatively slow or gentle fall of the yielding frame, the rollers 31, 31 passing out of the recesses 36, moving laterally the arms 33, 33, as the rollers rise on to the high section of the surface 34 thereof. Prior to the next succeeding operation of the molding machine and attachment the molding frame will have fallen to the position best shown in Fig. 2 of the drawings.

Having thus described my invention, what I claim as new and desire to secure by Letters Patent is:—

1. In a neck grooving attachment for bottle molding machines embodying a supporting frame fixedly connected with the molding frame and a yielding frame mounted in said supporting frame, a grooving mechanism comprising a shaft rotatively mounted in said yielding frame; a plurality of groove forming members extensible within the mouth of the bottle; means carried on said supporting frame for expanding said members as the yielding frame is lifted relative to said supporting frame; and means connected with said shaft for rotating the same.

2. In a neck grooving attachment for bottle molding machines embodying a supporting frame fixedly connected with the molding frame and a yielding frame mounted in said supporting frame, a grooving mechanism comprising a shaft rotatively mounted in said yielding frame; a plurality of groove forming members extensible within the mouth of the bottle; means carried on said supporting frame for expanding said members as the yielding frame is lifted relative to said supporting frame; and means fixedly attached to said shaft operative by said supporting frame when said yielding frame is reciprocated thereon to rotate said shaft.

3. In a neck grooving attachment for bottle molding machines embodying a supporting frame fixedly connected with the molding frame and a yielding frame mounted in said supporting frame, a grooving mechanism comprising a shaft rotatively mounted in and supported upon said yielding frame, said shaft having formed thereon a screw thread; means mounted on said supporting frame to engage said screw thread to rotate said shaft; a plurality of groove forming members extensible within the mouth of the bottle; and means carried on said supporting frame for expanding the said members as the yielding frame is lifted relative to the supporting frame.

4. An attachment of the character named, having a rotary shaft, a molding tool operatively connected with said shaft, comprising a plurality of spreader arms pivotally connected to said shaft, said arms having cam surfaces turned toward the rotary center of said shaft; a guide block for said arms; a plurality of rollers disposed in said guide block between said arms to bear against the said cam surfaces; means for pressing said arms against said rollers; means for reciprocating said guide block lengthwise of said arms; and means for relieving the outward pressure of said rollers on said arms at near the extremes of said arms.

5. An attachment of the character named, having a rotary shaft, a molding tool operatively connected with said shaft, comprising a plurality of spreader arms pivotally connected to said shaft, said arms having cam surfaces turned toward the rotary center of said shaft; a rotary guide block for said arms; a plurality of rollers disposed in said guide block between said arms to bear against the said cam surfaces means for pressing said arms against said rollers; means for reciprocating said guide block lengthwise of said arms; and means for relieving the outward pressure of said rollers on said arms at near the extremes of said arms.

In testimony whereof I have signed my name to this specification in the presence of two subscribing witnesses.

ROBERT JOHNS.

Witnesses:
E. F. MURDOCK,
PHILIP D. ROLLHAUS.